(12) United States Patent
Englert et al.

(10) Patent No.: US 7,719,469 B2
(45) Date of Patent: May 18, 2010

(54) DEVICE AND METHOD FOR POSITION MEASUREMENT BY MEANS OF LINEAR DOPPLER SHIFTS GENERATED

(75) Inventors: Walter Englert, Burgrieden (DE); Tilman Bucher, Munich (DE)

(73) Assignee: Cairos Technologies AG, Karlsbad (DE)

( * ) Notice: Subject to any disclaimer, the term of this patent is extended or adjusted under 35 U.S.C. 154(b) by 138 days.

(21) Appl. No.: 11/539,570

(22) Filed: Oct. 6, 2006

(65) Prior Publication Data

US 2008/0084351 A1    Apr. 10, 2008

(51) Int. Cl.
*G01S 3/52* (2006.01)
(52) U.S. Cl. ..................................... 342/418
(58) Field of Classification Search ................ 342/418, 342/423, 104, 385–407
See application file for complete search history.

(56) References Cited

U.S. PATENT DOCUMENTS 3,113,306 A    12/1963    Gardner et al.
3,704,465 A *  11/1972    Masak et al. ................. 342/386
4,060,809 A *  11/1977    Baghdady .................... 342/451
4,509,052 A *  4/1985     Cash .......................... 342/418
5,657,026 A *  8/1997     Culpepper et al. ........... 342/374
2004/0196184 A1* 10/2004   Hollander et al. ............ 342/418

FOREIGN PATENT DOCUMENTS

DE    102006047375.2-35    6/2007

* cited by examiner

*Primary Examiner*—Thomas H Tarcza
*Assistant Examiner*—Nga X Nguyen
(74) *Attorney, Agent, or Firm*—Michael A. Glenn; Glenn Patent Group

(57) ABSTRACT

A position determination method including a step of transmitting a periodic signal having a carrier frequency, a step of sequentially receiving the periodic signal having the carrier frequency at various locations using at least one antenna, and a step of determining a first coordinate of the object location on the basis of a zero crossing of a Doppler frequency response which may be associated with the first coordinate of the object location, the first coordinate of the object location corresponding to a coordinate of that location of the at least one antenna which it has when receiving the periodic signal at the zero crossing in relation to the object location.

10 Claims, 3 Drawing Sheets

DEVICE AND METHOD FOR POSITION MEASUREMENT BY MEANS OF LINEAR DOPPLER SHIFTS GENERATED

BACKGROUND OF THE INVENTION

1. Field of the Invention

The present invention relates to a device and to a method for providing information about an object location by observing a Doppler frequency response regarding the object location such as may be employed, for example, for determining the positions of game devices, in particular balls.

2. Description of Prior Art

For quite some time, various interest groups have wished to study and understand the sequence of movements of moving objects and/or persons, which requires an exact indication of the object's position both in space and time. What is of particular interest here are, among other things, game balls, in particular in commercialized types of sport, such as footballs, or soccer balls, which are highly accelerated in three-dimensional space, as well as tennis or golf balls. The question of who was the last to touch the object of the game, how it was hit, and in which direction it was accelerated further may be decisive for the outcome of the game, depending on the type of game.

Game devices that are used in high-performance sports, such as tennis balls, golf balls, footballs and the like, nowadays can be accelerated to extremely high speeds, so that a detection of the object during the movement requires highly sophisticated technology. The technical means employed so far—mainly cameras—either completely fail to meet the requirements set forth above, or meet them only to an insufficient degree. Also, hitherto known methods for position finding by means of various transmitter and receiver combinations still leave a large error margin with regard to the spatial resolution of the position indication, with regard to the ease of use of the transmitter/receiver components required, and above all with regard to evaluating the data obtained by means of the transmitter/receiver system, so that it is not yet possible, or at least requires a large amount of effort, to evaluate the results obtained from this data as fast as possible.

It is not only in the field of commercial sports, where movable game devices may be employed, but it is also in the personal field that users have become more and more used to electronic devices indicating various pieces of information to give a user feedback as to how he/she has affected an object, or to provide him/her with information about whether, for example, a game device has crossed a pitch line.

Current statistics methods in commercial applications, such as of the German first football division (Bundesliga), work with recording relatively simple statistics, such as the percentage of ball contacts of a team or the number of corners, free kicks or fouls.

On the other hand, there have been means, for example in tennis, where there is a very plannable, clearly arranged environment with only two players, which measure, for example, the speed of the tennis ball at the serve, such that a viewer is in a position to assess whether a serve was "hard" or "soft".

What is problematic about such speed measurements which may occur by optical methods is the fact that they do not function within an environment where there is a muddle of players, such as on a football pitch where there are not only two persons being active, but 22 persons, who, in addition, are not positioned in more or less the same place but may form any constellation on the pitch. On the other hand, particularly in football, it is interesting, both for the feedback of the players in training and for the viewers to know, for example, how fast a ball is flying or whether there is a goal situation or an offside situation at hand.

Thus, a multiplicity of tasks, for example locating a ball in a football match, presuppose knowledge of positions of objects. In a football match, for example, one of the most controversial topics is whether or not, in critical situations, the ball has crossed the goal line. For this purpose, it is necessary that the ball's position at the goal line can be measured with an accuracy of about +/−1.5 cm.

There are numerous localization methods based, for example, on optical two-dimensional or three-dimensional sensor having an evaluation system, an exploitation of the known radar principle or of a principle of radio localization.

One principle of radio localization is the localization of objects by electromagnetic wave propagation. For example, a receiver is integrated into an object to be localized or mounted to an object to be localized, the receiver being able to send data to a central transmitting/receiving device upon request. Thereafter, a position of the object is calculated from signal delay times and/or from differences between at least two signals received at different antennas.

Currently available localization methods based on optical 2D or 3D sensors having an evaluation system, or based on the use of conventional radio localization methods, entail high investment and maintenance cost, sensitivity toward environmental conditions and a large outlay in terms of adapting the evaluation algorithms. To achieve fine resolution of a position determination, systems using conventional radio localization are not suitable, since with a small geometrical expansion, differences of various signal delay times are hardly measurable any more. The requirements placed upon system for localizing objects thus are not met, or are met only to an insufficient degree, with regard to economy, robustness, clock time and object independence, for exact position determination, for example, within a range of a few centimeters.

SUMMARY OF THE INVENTION

The object of the present invention is thus to provide an improved but, at the same time, low-expense concept for localizing objects.

In accordance with a first aspect, the invention provides a device for providing information about an object location within a location determination area wherein the object is positioned, it being possible to associate a first coordinate with the object location, the device including:

a sequential transmitter and/or receiver having at least one antenna for sequentially transmitting or receiving periodic signals having a carrier frequency at various locations; and a location determiner for determining the first coordinate of the object location on the basis of a zero crossing of a Doppler frequency response which may be associated with the first coordinate of the object location, the first coordinate of the object location corresponding to a coordinate of that location of the at least one antenna which it has when transmitting or receiving the periodic signal at the zero crossing in relation to the object location.

In accordance with a second aspect, the invention provides a movable object for position determination within a location determination area, including:

a transmitter for transmitting periodic signals having a carrier frequency.

In accordance with a third aspect, the invention provides a movable object for position determination in a location determination area, including:

a receiver for receiving periodic signals from a sequential transmitter having at least one antenna for sequentially transmitting the periodic signals having a carrier frequency at various locations; and a location determiner for determining the first coordinate of the object location on the basis of a zero crossing of a Doppler frequency response which may be associated with the first coordinate of the object location, the first coordinate of the object location corresponding to a coordinate of that location of the at least one antenna which it has when transmitting the periodic signal at the zero crossing in relation to the object location.

In accordance with a fourth aspect, the invention provides a position determination system, including:

a device for providing information about an object location within a location determination area wherein the object is positioned, it being possible to associate a first coordinate with the object location, including a sequential receiver having at least one antenna for sequentially receiving periodic signals having a carrier frequency at various locations, a location determiner for determining the first coordinate of the object location on the basis of a zero crossing of a Doppler frequency response which may be associated with the first coordinate of the object location, the first coordinate of the object location corresponding to a coordinate of that location of the at least one antenna which it has when receiving the periodic signal at the zero crossing in relation to the object location; and an object, the position of which may be determined, having a transmitter for transmitting a periodic signal having the carrier frequency.

In accordance with a fifth aspect, the invention provides a position determination system, including:

device for providing information about an object location within a location determination area wherein the object is positioned, it being possible to associate a first coordinate with the object location, including a sequential transmitter having at least one antenna for sequentially transmitting periodic signals having a carrier frequency at various locations; and a location determiner for determining the first coordinate of the object location on the basis of a zero crossing of a Doppler frequency response which may be associated with the first coordinate of the object location, the first coordinate of the object location corresponding to a coordinate of that location of the at least one antenna which it has when receiving the periodic signal at the zero crossing in relation to the object location; and an object, the position of which may be determined, having a receiver for receiving periodic signals from the sequential transmitter having the at least one antenna for sequentially transmitting periodic signals having the carrier frequency at various locations, a location determiner for determining the first coordinate of the object location on the basis of a zero crossing of a Doppler frequency response which may be associated with the first coordinate of the object location, the first coordinate of the object location corresponding to a coordinate of that location of the at least one antenna which it has when transmitting the periodic signal at the zero crossing in relation to the object location.

In accordance with a sixth aspect, the invention provides a method for providing information about an object location within a location determination area wherein the object is positioned, it being possible to associate a first coordinate with the object location, the method including the steps of:

sequentially transmitting or receiving periodic signals having a carrier frequency at various locations using at least one antenna; and determining the first coordinate of the object location on the basis of a zero crossing of a Doppler frequency response which may be associated with the first coordinate of the object location, the first coordinate of the object location corresponding to a coordinate of that location of the at least one antenna which it has when transmitting or receiving the periodic signal at the zero crossing in relation to the object location.

In accordance with a seventh aspect, the invention provides a position determination method including the steps of:

transmitting a periodic signal having a carrier frequency;

sequentially receiving the periodic signal having the carrier frequency at various locations using at least one antenna; and determining a first coordinate of the object location on the basis of a zero crossing of a Doppler frequency response which may be associated with the first coordinate of the object location, the first coordinate of the object location corresponding to a coordinate of that location of the at least one antenna which it has when receiving the periodic signal at the zero crossing in relation to the object location.

In accordance with an eighth aspect, the invention provides a position determination method including the steps of:

sequentially transmitting a periodic signal having the carrier frequency at various locations using at least one antenna;

receiving the periodic signal having the carrier frequency; and determining a first coordinate of the object location on the basis of a zero crossing of a Doppler frequency response which may be associated with the first coordinate of the object location, the first coordinate of the object location corresponding to a coordinate of that location of the at least one antenna which it has when transmitting the periodic signal at the zero crossing in relation to the object location.

In accordance with a ninth aspect, the invention provides a computer program having a program code for performing the method for providing information about an object location within a location determination area wherein the object is positioned, it being possible to associate a first coordinate with the object location, the method including the steps of:

sequentially transmitting or receiving periodic signals having a carrier frequency at various locations using at least one antenna; and determining the first coordinate of the object location on the basis of a zero crossing of a Doppler frequency response which may be associated with the first coordinate of the object location, the first coordinate of the object location corresponding to a coordinate of that location of the at least one antenna which it has when transmitting or receiving the periodic signal at the zero crossing in relation to the object location, when the computer program runs on a computer or a microcontroller.

In accordance with a tenth aspect, the invention provides a computer program having a program code for performing the position determination method including the steps of:
- transmitting a periodic signal having a carrier frequency;
- sequentially receiving the periodic signal having the carrier frequency at various locations using at least one antenna; and
- determining a first coordinate of the object location on the basis of a zero crossing of a Doppler frequency response which may be associated with the first coordinate of the object location, the first coordinate of the object location corresponding to a coordinate of that location of the at least one antenna which it has when receiving the periodic signal at the zero crossing in relation to the object location, when the computer program runs on a computer or a microcontroller.

In accordance with an eleventh aspect, the invention provides a computer program having a program code for performing the position determination method including the steps of:
- sequentially transmitting a periodic signal having the carrier frequency at various locations using at least one antenna;
- receiving the periodic signal having the carrier frequency; and
- determining a first coordinate of the object location on the basis of a zero crossing of a Doppler frequency response which may be associated with the first coordinate of the object location, the first coordinate of the object location corresponding to a coordinate of that location of the at least one antenna which it has when transmitting the periodic signal at the zero crossing in relation to the object location, when the computer program runs on a computer or a microcontroller.

The present invention is based on the findings that an exact and low-effort determination of a position of an object may be achieved when Doppler frequency shifts of the periodic signal are generated using at least one antenna for sequential transmission or reception of periodic signals having a carrier frequency at different locations, in relation to an object location, and when a coordinate of the object location is determined on the basis of a zero crossing of the Doppler frequency shifts, it being possible to associate the zero crossing with the coordinate of the object location. The coordinate of the object location corresponds to a coordinate of that location of the at least one antenna which it has when transmitting or receiving the periodic signal at the zero crossing of the Doppler frequency shifts in relation to the object location.

In accordance with the invention, by means of a linear movement of an antenna or by means of a simulated linear movement by a plurality of antennas and by transmitting and/or receiving a periodic signal to or from the object whose location is to be determined, a Doppler frequency response with regard to the object location is achieved.

In accordance with an embodiment of the present invention, the object whose position is to be determined emits a periodic signal having a carrier frequency $f_c$. Along the location determination area, there is positioned, for example, a linear antenna array having a plurality of antennas, the number of antennas co-determining a location resolution area in relation to the location determination area and/or their mutual distances. For simulating an antenna movement, each antenna of the plurality of antennas is sequentially operated as a receive antenna, in accordance with the invention. The simulated antenna movement direction extends along a line tangentially to a circle around the location of the object. Positive Doppler frequencies arise when a radial component of the speed vector $\vec{v}$ does not disappear, i.e. a projection of speed vector $\vec{v}$ to the connecting line between the object location and the location of that antenna which is being operated as the receive antenna. Due to the fact that a different antenna, respectively, of the plurality of antennas is operated as the receive antenna in a sequential manner, an angle between the speed vector $\vec{v}$ of the simulated antenna movement and the location connecting line between the object location and the location of that antenna which is currently acting as the receive antenna will change. Thus, the magnitude and the direction of the projection of speed vector $\vec{v}$ to the location connecting line will also change. Thus, one will obtain a time curve of Doppler frequencies which will exhibit a zero crossing precisely when the location connecting line is perpendicular, or at least approximately perpendicular, to the speed vector v. Since the coordinates of the individual antennas of the plurality of antennas are known, the zero crossing of the Doppler frequency response may thus be associated with a coordinate of the object location. This coordinate may be derived from the coordinate of that antenna which during the reception of the periodic signal sees no, or approximately no Doppler frequency.

If a sufficient number of antennas are used in relation to the location determination area, so that distances between the antennas are small, a resolution of an inventive location determination system may be increased. If, for example, the plurality of antennas are arranged in the form of a linear antenna array in parallel with a touch line of a football pitch in a football match, the ball movements, for example, may be tracked throughout the match in the form of the ball height. Thus, decisions may be made easier for a referee, such as decisions about corner kicks, goal decisions or offside decisions.

In accordance with a further embodiment of the present invention, a second coordinate of the object to be localized may be determined, for example, in that one observes the inclination of the temporal frequency response in the zero crossing of the Doppler frequency response. If the object to be localized is positioned, for example, near the line of motion of the at least one antenna, or of the antenna array, a inclination of the Doppler frequency response will be considerably steeper in the area of the zero crossing than if the object is spaced further apart from the motion axis of the at least one antenna, or of the antenna array.

Thus, with the inventive concept, a first coordinate of an object to be localized may be determined in that the zero crossing of the Doppler frequency response is determined, and a second coordinate of the object to be localized may be determined in that one observes the inclination of the Doppler frequency response in the zero crossing.

In accordance with further embodiments of the present invention, an increased level of reliability of the inventive concept may be achieved in that the inventive location determination system is constructed in a redundant manner, for example. This means that, for example, not only one antenna array is arranged in parallel with a first touch line of a pitch, but that, in addition, a second antenna array is arranged in parallel with a second touch line. In addition, further antenna arrays may be mounted in parallel with the two bylines, for example. Due to the fact that, thus, four values are determined for one ball position, the level of reliability of the location determination system may be considerably increased.

In accordance with further embodiments of the present invention, the at least one antenna, or the plurality of antennas, may also be used to sequentially transmit periodic signals having a carrier frequency $f_c$ to various locations. With these embodiments, the object to be localized will have a respective receiver and the location determination means for determining the coordinates of the object location arranged therein, on the basis of the zero crossing of the Doppler frequency response. Such a scenario, where the location determination takes place within the object to be localized is feasible, for example, when an energy supply of the object to be localized is uncritical.

Thus, the inventive concept provides the possibility of determining the position of an object, and the possibility of determining a movement of the object on the basis of associating a zero crossing of a Doppler frequency response with a first coordinate of the object location.

Embodiments of the present invention have the advantage that a determination of the position of an object, in particular of a movable object, such as a game device, may be effected without any intervention into the activity of a ball game.

A further advantage of the present invention is that the position determination may be realized at low expense.

There is no necessity of any complicated evaluation algorithms, nor of any high-effort measures for synchronizing transmit and receive units.

BRIEF DESCRIPTION OF THE DRAWINGS

These and other objects and features of the present invention will become clear from the following description taken in conjunction with the accompanying drawing, in which.

DESCRIPTION OF PREFERRED EMBODIMENTS

Figure 1:
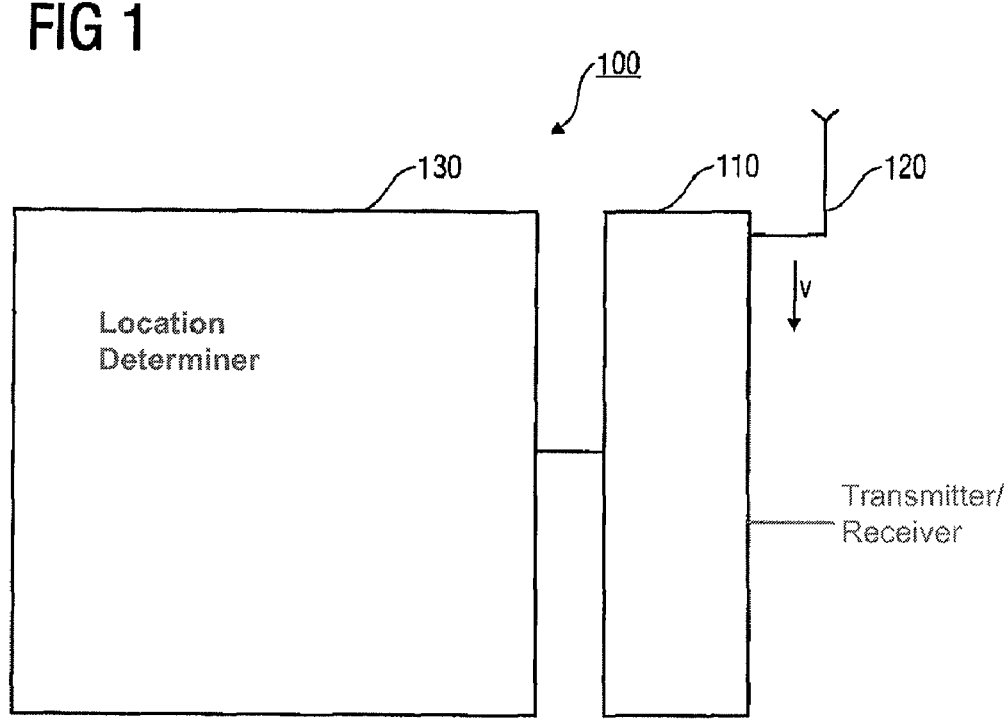
FIG. 1 shows a schematic block diagram of a device for providing information about an object location in accordance with an embodiment of the present invention.

With regard to the following description, one should note that in the various embodiments, functional elements which are identical or have identical actions exhibit identical reference numerals, and that the descriptions of these functional elements are thus interchangeable within the various embodiments presented below.

FIG. 1 shows a schematic block diagram of a device 100 for providing information about an object location in a location determination area having a means 110 with at least one antenna 120 and a location determination means 130. Means 110 is coupled to means 130.

Means 110 having the at least one antenna 120 serves to sequentially transmit or receive periodic signals having a carrier frequency $f_c$ at various locations to generate a Doppler frequency response. Sequential transmission or reception at various locations may be achieved in that, in accordance with an embodiment of the present invention, an antenna is physically moved, for example, from one location to another by a sledge on a rail.

In further preferred embodiments of the present invention, an antenna movement, and thus a Doppler frequency response, is simulated in that means 110 comprises a plurality of antennas, for example a linear antenna array, and in that the individual antennas of the plurality of antennas are operated sequentially as transmit or receive antennas, respectively. This configuration offers the advantage that any mechanical stress due to physical motion may be reduced.

The location determination means 130 serves to determine a first coordinate of the object location based on a zero crossing of the Doppler frequency response, it being possible to associate the zero crossing with the first coordinate of the object location. The first coordinate of the object location corresponds to a coordinate of the at least one antenna 120 of means 110, the at least one antenna 120 taking up said object location in relation to the object to be localized when transmitting or receiving the periodic signal at the zero crossing.

If the at least one antenna 120 of means 110 is used for sequentially receiving periodic signals, in accordance with a preferred embodiment of the present invention, the location determination means 130 will be directly, i.e., for example by means of cables, coupled to means 110. If an antenna array is used, the individual antennas of the array will be preferably connected to a receiver and/or transmitter by cables of equal lengths, respectively, or by cables of at least calculable lengths, respectively.

In accordance with embodiments of the present invention, the at least one antenna 120 may be operated as a transmit antenna. In this configuration, the location determination means 130 is preferably located within or at the object to be localized. In this case, means 110 and location determination means 130 are preferably coupled via a radio link between the at least one transmit antenna 120 and the object to be localized.

In accordance with further embodiments of the present invention, location determination means 130 is further configured to determine, in addition to the first coordinate, a second coordinate of the object location on the basis of an inclination of the Doppler frequency response in the zero crossing.

Figure 2:
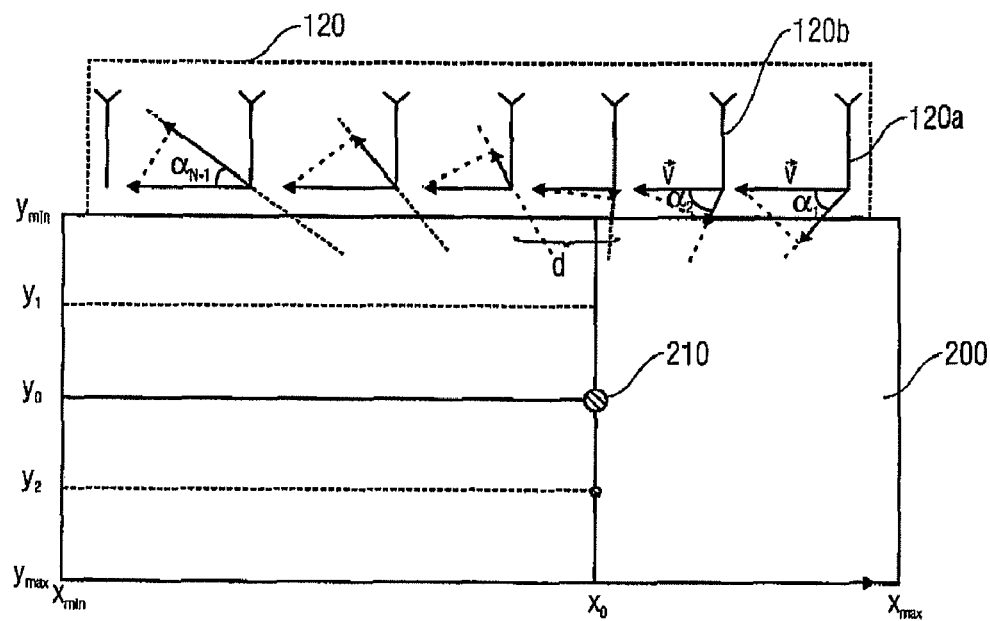
FIG. 2 shows a schematic representation of an antenna movement and/or a simulated antenna movement along a location determination area for generating a Doppler frequency response in accordance with an embodiment of the present invention.

For a more detailed illustration of the inventive concept, FIG. 2 depicts a location determination area 200, the location determination area 200 being representable by an x axis and y axis. Within the location determination area 200, an object to be localized 210 is positioned at an object location having a first coordinate $x_0$ and a second coordinate $y_0$. In parallel with the x axis on the edge of, or outside the location determination area 200, there is a linear antenna array 120 having a plurality of individual antennas, of which only two are designated by reference numerals 120a and 120b for clarity's sake.

For simulating an antenna movement, the individual antennas of antenna array 120 are connected, in quick succession, as active receive antennas, respectively, in accordance with one embodiment of the present invention. Initially, for example, antenna 120a is switched as the active receive antenna at a time $T_o$. After a duration of $\Delta T$, i.e. at a time $T_o + \Delta T$, antenna 120a is switched off, and second antenna 120b is used as the active receive antenna. After a further duration ΔT, antenna 120b is switched off, and the next antenna is switched as the active receive antenna, etc.

If a distance between the individual antennas of antenna array 120 is d in each case, the scenario depicted in FIG. 2 results in a simulated antenna speed v=d/ΔT in parallel with the x axis of the location determination area 200 from the right to the left. Thus, the speed vector $\vec{v}$ will point from the right to the left along the antenna array. The measurement accuracy of the inventive concept may be increased by increasing the number of antennas in relation to the location determination area 200, and/or by reducing the distance d of the antennas. In addition, an increase in the simulated speed v and/or a reduction of the time duration ΔT will also have positive effects on the measurement accuracy.

The individual receive antennas of antenna array 120 receive, in accordance with one embodiment of the present invention, replica, which sequentially vary in time, of the periodic signal having the carrier frequency $f_c$ which has been emitted by the object to be localized. The various replica exhibit different phases of the periodic signal. On this topic, FIG. 3 shows a potential wiring of antenna array 120 so as to obtain therefrom a Doppler frequency response with the plurality of antennas of antenna array 120.

Figure 3:
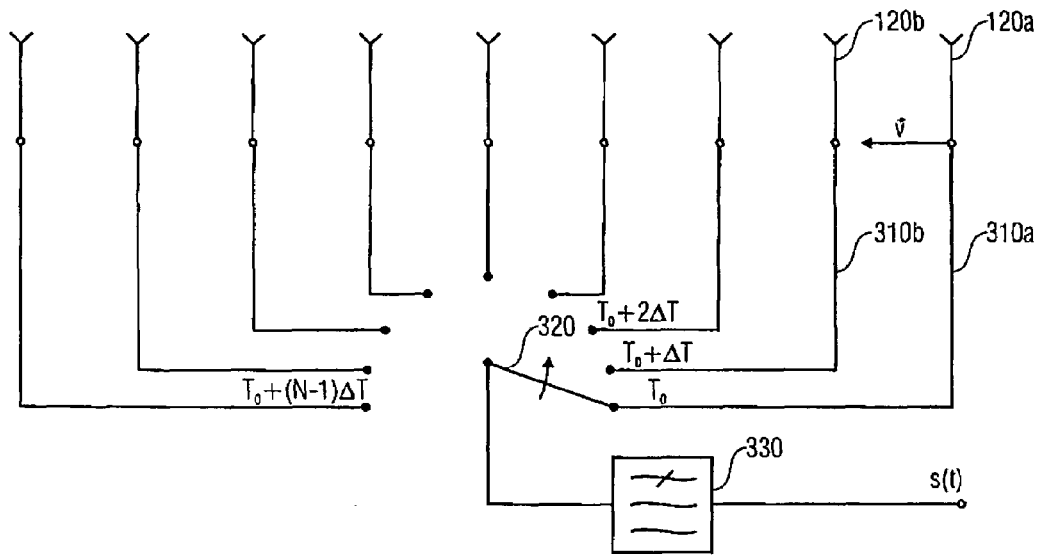
FIG. 3 shows a schematic representation of the wiring of an antenna array for generating a simulated antenna movement in accordance with an embodiment of the present invention.

FIG. 3 shows antenna array 120 having individual antennas 120a and 120b connected to a switching device 320 via cables, only two of which are provided by reference numerals 300a and 300b for clarity's sake. Switching device 320, in turn, is coupled to a filtering means 330, at the output of which a filter output signal is provided.

Cables 310a, 310b are preferably equal in length or have at least calculable lengths. Equal lengths of the cables from the antennas to the switching device 320 are advantageous for obtaining no additional different phase shifts between the individual receive branches due to signal delay times by cables 310a, b. As has already been described above, for position measuring, the antennas of antenna array 120 are switched, for example, as active receive antennas in quick succession, in accordance with the invention. This is achieved by means of switching means 320. Thus, a fast linear movement along the line defined by the antenna array is simulated electronically. This simulated movement creates the Doppler effect. The change in the frequency of waves of any kind while a signal source is moving toward or away from an observer is referred to as the Doppler effect. In the event of the approximation, the frequency will increase, in the opposite case it will decrease.

The signal applied at the input of filtering means 230 because of the switching of the antennas in a temporally sequential manner comprises phase jumps at time intervals of ΔT. The phase jumps of the replica of the carrier signal having the carrier frequency $f_c$ are generally different from one another between two adjacent antennas, respectively, of antenna array 120. In a linear antenna array comprising N antenna elements, a signal comprising (N−1) phase jumps and/or phase differences $\Delta\theta_1, \ldots, \Delta\theta_{N-1}$ will result at the input of filtering means 330. (N−1) discrete Doppler frequencies $f_{D,1}, \ldots, f_{D,N-1}$ may be determined from the (N−1) phase differences $\Delta\theta_1, \ldots, \Delta\theta_{N-1}$. The $n^{th}$ (n=1, 2, ..., N−1) phase difference $\Delta\theta_n$ may be calculated to yield $$\Delta\theta_n = 2\pi f_c \cdot \frac{d}{c} \cdot \cos\alpha_n, \quad (1)$$

wherein $\alpha_n$ signifies the angle between speed vector $\vec{v}$ and the location connecting vector of the $n^{th}$ antenna and the object location $(x_0, y_0)$. On the basis of the connection d=v·ΔT, the following results from equation (1) for the $n^{th}$ Doppler frequency at the $n^{th}$ antenna $$f_{D,n} = \frac{\Delta\theta_n}{2\pi \cdot \Delta T} = \frac{v}{c} f_c \cdot \cos\alpha_n \quad (2)$$

It may be seen from equation (2) that at that x coordinate where speed vector $\vec{v}$ is perpendicular to the location connecting vector, the Doppler frequency disappears because of the cosine term, and/or a Doppler frequency response has a zero crossing across the antennas of antenna array 120. In addition, a maximum Doppler frequency results at $f_{D,max}=v/c \cdot f_c$.

Thus, for the situation depicted in FIG. 2, a zero crossing of the Doppler frequency response will result for that antenna whose x coordinate equals the x coordinate $x_0$ of the object 210 to be localized.

To obtain a continuous Doppler frequency response from the discretely calculated Doppler frequencies $f_{D,n}$ (n=1, 2, ..., N−1), an interpolation may be made by means an appropriate interpolation between the discrete Doppler frequencies $f_{D,n}$. Thus, in accordance with an embodiment of the present invention, means 330 may comprise an A/D converter and a digital filtering means to perform the above-described steps to obtain a continuous Doppler frequency response.

In accordance with a further embodiment of the present invention, filtering means 330 may also comprise an analog bandpass filter having a passband of $2f_{D,max}$ around carrier frequency $f_c$, so that an analog continuous signal having a frequency range of $f_c \pm f_{D,max}$ is applied at the output of filtering means 330. This filtered, analog signal present at the output of filtering means 330 will then also exhibit the Doppler frequency response described.

Figure 4:
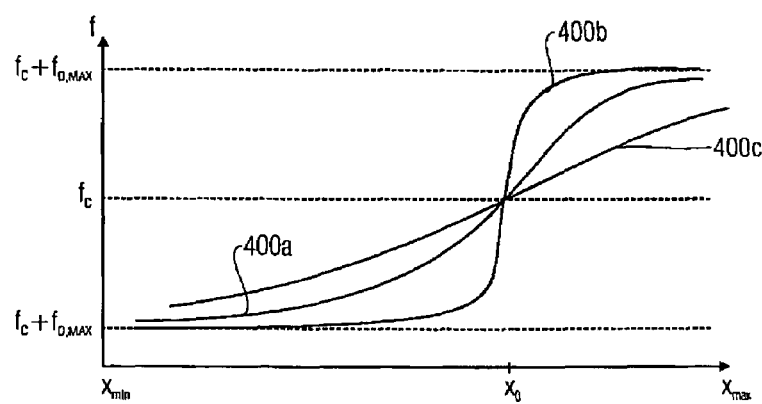
FIG. 4 shows a representation of various Doppler frequency responses for different positions of the object to be localized in the location determination area, in accordance with an embodiment of the present invention.

To illustrate the various Doppler frequency responses for the different positions $(x_0, y_0), (x_0, y_1), (x_0, y_2)$, indicated in FIG. 2, of the object 210 to be localized, the Doppler frequency responses resulting from the different positions are depicted in FIG. 4 by way of example.

FIG. 4 shows three Doppler frequency responses 400a, 400b, 400c which may be associated with the positions $(x_0, y_0), (x_0, y_1), (x_0, y_2)$, indicated in FIG. 2, of the object to be localized 210. The Doppler frequencies are in a range of $\pm f_{D,max}$ around carrier frequency $f_c$. Thus, the zero crossing of the Doppler frequency response will be located where the curves have a frequency value of $f_c$. Since for the positions $(x_0, y_0), (x_0, y_1), (x_0, y_2)$, indicated in FIG. 2 by way of example, of the object to be localized, the x coordinate $x_0$ is identical in each case, the three Doppler frequency responses shown in FIG. 4 all have their zero crossings at $x=x_0$.

However, the Doppler frequency responses have different inclinations in an area around the zero crossing at $x=x_0$, which is due to the various y coordinates. If the object location is positioned relatively close to the antenna array 120, such as the location having coordinates $(x_0, y_1)$, the inclination will have a relatively large value within a range around the zero crossing of the respective Doppler frequency response 400b. On the other hand, if an object is spaced away from the antenna array 120 at a relatively far distance, as is the case for the location having coordinates $(x_0, y_2)$, the inclination of the resulting Doppler frequency response will be relatively low in the range around its zero crossing, as is shown for curve 400c. The explanation for this is found in the cosine term of equation (2). For a location near the antenna array 120, angles $\alpha_n$ are mostly very small, except for a small range around x coordinate $x_0$. On the other hand, for locations which are spaced away from the antenna array 120 at a relatively large distance, angles $\alpha_n$ are mostly relatively large, accordingly.

Thus, depending on the x, y coordinate of an object 210 to be localized, a specific and unambiguous Doppler frequency response results from antenna array 120. The x position of the object 210 to be localized which may comprise a transmitter for the periodic signal is measured by determining the zero crossing of the Doppler frequency curve. The y position may be determined by the inclination and/or the curvature of the Doppler frequency response at the zero crossing.

It shall be mentioned at this point that a second coordinate, or a y coordinate, may be determined in an unambiguous manner only if a two-dimensional location determination area is defined. Generally, the inclination of the Doppler frequency response in the zero crossing indicates a location which may be positioned on a cylinder, speed vector $\vec{v}$ of the linear antenna motion describing the longitudinal axis of the cylinder. For an unambiguous location determination within a two-dimensional location determination area it is therefore advantageous for the longitudinal axis of the cylinder, i.e. speed vector $\vec{v}$, to be positioned at the edge of, or outside the location determination area. However, if the longitudinal axis of the cylinder is positioned within the two-dimensional location determination area, unambiguous determination of the second coordinate is not readily possible due to the rotational symmetry of a cylinder.

In addition, an exact position determination within a three-dimensional location determination area is also possible with the inventive concept. If a three-dimensional location determination area is defined by a coordinate system having three coordinate axes (x, y, z) perpendicular to one another, respectively, the inventive concept may be used to perform a location determination for an object to be located within the three-dimensional space by arranging, for example, an antenna array to be parallel to the x axis, and by arranging a second antenna array to be perpendicular thereto and parallel to the z axis. As has already been described above, the first antenna array may be used to perform a two-dimensional location determination (x and y coordinates), and the second antenna array may be used to determine, for example, the remaining third coordinate (z coordinate). However, the antenna arrays are preferably positioned at the edge of, or outside the three-dimensional location determination area.

Also, for three-dimensional location determination, the use of a two-dimensional antenna matrix is feasible which may be arranged, for example, in parallel with a (x, z) plane at the edge of or outside a three-dimensional location determination area.

In addition, mention shall be made that the linear movement for achieving the Doppler effect may not only be simulated electronically, but that this movement may actually also be brought about physically. In an embodiment of the present invention, it is feasible, for example, for one individual antenna to be moved to and fro in parallel with a coordinate axis at the edge of a location determination area on a motion device, such as a sledge guided on rails. If the antenna movement is actually realized physically, or mechanically, additional electronic processing of the periodic signals received may be dispensed with, since in this case a signal received will exhibit a continuous frequency response and will have no phase jumps. However, in practice one will only be able to achieve moderate speeds with a mechanical motion device.

As has already been mentioned above, a resolution capability of the inventive concept may be increased by increasing the speed of the linear movement, or of the simulated linear movement. In a system wherein the linear movement is simulated electronically, this may be effected by faster sequential switching of the individual antennas. In accordance with embodiments of the present invention, this preferably results in simulated speeds of v>c/1000, c standing for the speed of light.

If the speed is, e.g., v=c/100, and if the carrier frequency of the periodic signal is $f_c$=2.4 GHz, a maximum-magnitude Doppler frequency shift of $f_{D,max}$=24 MHz will result. If antennas of an antenna array have a mutual distance of, e.g., d=10 cm, and if they are switched to be active in a temporally sequential manner by means of a switching device 320 so as to simulate an antenna movement, the switching time $\Delta T$ will amount to about 33 ns for simulating the speed of v=c/100.

In addition, mention shall be made that the antennas of an antenna array and/or the antenna on a moved sledge may not only serve as receive antennas for a periodic signal emitted by the object to be localized, but that in accordance with further embodiments of the present invention, they may also act as transmit antennas. In this configuration, the object to be localized requires a respective receiver so as to be able to determine, with an inventive location determination means, at least one coordinate of the object location on the basis of the zero crossing of the Doppler frequency response. If the object location determined by the object to be localized is to be made available, for example, to a central computer, the object to be localized will additionally require, e.g., a radio transmitter to transmit the object location determined to the central calculating unit.

In accordance with an embodiment of the present invention, it is possible to measure in advance relevant positions and/or the associated Doppler frequency responses of an object at a desired accuracy within a location determination area, and to associate the measured values and/or Doppler frequency responses, for example, in a so-called lookup table, with the respective object coordinates, and to store them. Of course, it is equally feasible for Doppler frequency responses regarding object positions to be calculated, in accordance with a further embodiment of the present invention, in the location determination area by means of mathematical formulae, so as to subsequently be associated, in a lookup table, with the respective object coordinates. If, subsequently, a Doppler frequency response is measured for any location of the location determination area, these measured values may then be compared with the values and/or Doppler frequency responses from the lookup table which have been measured, or calculated, and stored in advance, and thus they may possibly be associated with an object location.

If a position of an object to be localized is to be determined in a particularly reliable manner, it is also possible to provide, around a location determination area, several inventive means having at least one antenna for sequentially transmitting or receiving periodic signals having a carrier frequency $f_c$ at various locations. As has already been described above, these means may be antenna arrays, for example. In this respect, FIG. 5 shows a schematic structure of a position determination system for a game device, or, in a football match, for a ball.

Figure 5:
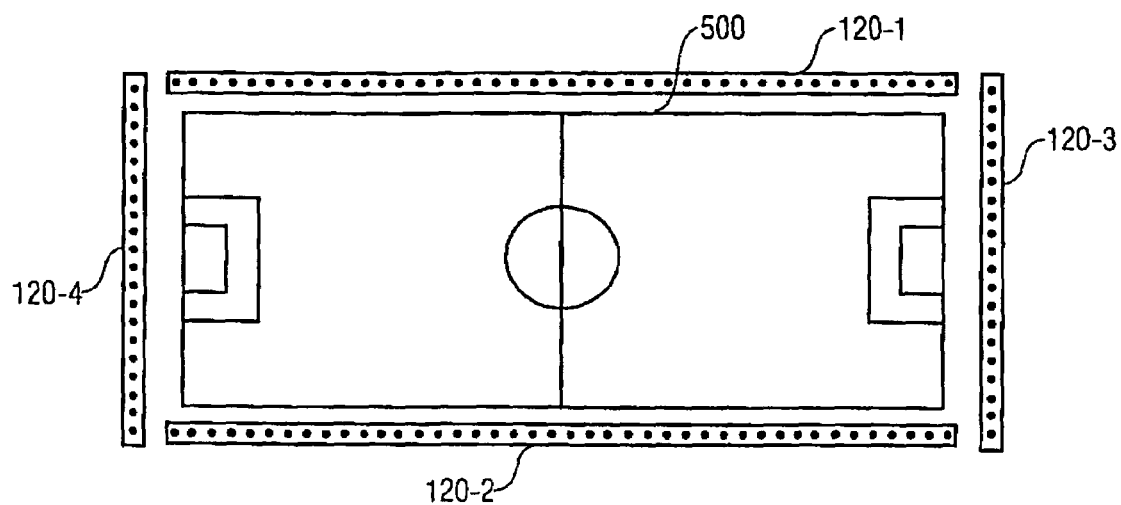
FIG. 5 is a schematic representation of a system for determining the position of a football on a football pitch, in accordance with an embodiment of the present invention.

FIG. 5 shows a football pitch 500 corresponding to a location determination area, to a first antenna array 120-1 in parallel with a first touch line of football pitch 500, to a second antenna array 120-2 in parallel with a second touch line of football pitch 500, to a third antenna array 120-3 in parallel with a first byline of football pitch 500, and to a fourth antenna array 120-4 in parallel with a second byline of football pitch 500.

With the system depicted in FIG. 5, the position of the game ball may be determined in a redundant manner. This is effected by means of the above-described inventive concept in such a manner that, for example, all four antenna arrays 120-1 to 120-4 act as receive arrays and are controlled at the same time. A location determination means, not shown, subsequently obtains four Doppler frequency responses corresponding to the four antenna arrays 120-1 to 120-4, all of which can ideally be associated with the same object location. With systems based on radio localization, however, it may generally occur that imprecise results with regard to a position determination may be achieved due to reflections or shadowing of the radio waves. If, for example, one of the four antenna arrays 120-1 to 120-4 provides an imprecise or ambiguous result, it is very likely that at least one other of the remaining antenna arrays will provide a precise result which may then be used for determining the position. A potential plausibility check could be, for example, an inclination and/or symmetry observation of the Doppler frequency response to the left and to the right of the zero crossing. For example, if the Doppler frequency response exhibits an inclination on one side of the zero crossing which differs from that on the other side, respectively, this indicates insufficient measurement accuracy. For example, the receive signals of specific antennas of the antenna array may fail and/or be corrupted due to reflections and/or shadowing. If a Doppler frequency response of an antenna array does not stand up to a plausibility check, the Doppler frequency response of a further antenna array may be used as the basis.

In the position determination system depicted in FIG. 5, it is also feasible for the four receive antenna arrays 120-1 to 120-4 to not be controlled simultaneously, but sequentially in time. During a first time interval, the first antenna array 120-1 will thus be active, during a second time interval, the second antenna array 120-2 will be active, etc.

As has already been described above, the antenna arrays 120-1 to 120-4 may also be used as transmit antenna arrays if a respective receive and location determination means is present within the ball. When using only a carrier frequency $f_c$, however, in this embodiment of the present invention, the transmit antenna arrays are preferably operated in successive time intervals, since otherwise the receive signals of the various antenna arrays 120-1 to 120-4 will superimpose one another within the ball, and signal differentiation will thus be rendered more difficult. If a different carrier frequency is used for each array, the transmit antenna arrays may also be operated simultaneously, and the signals may be separated by a respective filtering device.

Further possibilities of using the inventive concept are naturally also to be found in other sports where, for example, critical goal decisions and/or line decisions are to be made.

Using the inventive concept for determining positions is also feasible in other fields, such as logistics. In the field of logistics, the task often is to localize objects in warehouses, for example. To this end, warehouses may similarly be equipped with antenna arrays and/or movable individual antennas so as to be able to determine positions of objects of interest. The inventive method described may be employed, for example, within the framework of a RF-ID system, objects to be localized being equipped with passive or active RF-ID transponders.

It shall be pointed out, in particular, that the inventive scheme may also be implemented in software, depending on the circumstances. The implementation may be performed on a digital storage medium, in particular a disk or a CD with electronically readable control signals which may cooperate with a programmable computer system and/or microcontroller in such a manner that the respective method is performed. Generally, the invention thus also consists in a computer program product having a program code, stored on a machine-readable carrier, for performing the inventive method when the computer program product runs on a computer and/or microcontroller. In other words, the invention may thus be realized as a computer program having a program code for performing the method, when the computer program runs on a computer and/or microcontroller.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An object location system for providing information about an object location within a location determination area, comprising:
   a location determination area comprising a rectangular playing field, wherein the location determination area is associated with four linear sequential receivers, wherein one linear sequential receiver is situated along each side of the rectangular playing field, each linear sequential receiver having at least two antennas for sequentially receiving periodic signals having a carrier frequency, the antennas being arranged along a line, thus simulating the Doppler effect;
   a movable object within the location determination area containing a transmitter for transmitting period signals having a carrier frequency;
   a location determiner for determining the first coordinate of the object location within the location determination area on the basis of a zero crossing of a Doppler frequency response which may be associated with the first coordinate of the object location, the first coordinate of the object location corresponding to a coordinate of that location of one of the at least two antennas of at least one linear sequential receiver which it has when transmitting or receiving the periodic signal at the zero crossing in relation to the object location.

2. The object location system as claimed in claim 1, wherein each of the sequential receivers comprise a plurality of antennas, wherein each of the plurality of antennas are sequentially operated as a receive antenna to electronically simulate an antenna movement and to receive a periodic signal transmitted by the object.

3. The object location system as claimed in claim 1, wherein at least one of the at least two antennas of each of the sequential receivers comprise an individual antenna linearly movable along the location determination area.

4. The object location system as claimed in claim 1, wherein each of the sequential receivers are configured to cause an antenna movement speed $v > c/1000$, c representing the speed of light.

5. The object location system as claimed in claim 1, wherein the location determiner is further configured to determine a second coordinate of the object location on the basis of an inclination of the Doppler frequency response in the zero crossing of the Doppler frequency response.

6. The object location system as claimed in claim 1, wherein the location determiner exhibits an analog bandpass filter having a passband around the carrier frequency for filtering the signals from at least one of the at least two antennas of at least one linear sequential receiver.

7. The object location system as claimed in claim 1, wherein the location determiner includes an A/D converter and a digital bandpass filter having a passband around the carrier frequency for filtering the signals from at least one of the at least two antennas of at least one linear sequential receiver.

8. A simulated Doppler effect position determination system, comprising:
   device for providing information about an object location within a location determination area wherein the object is positioned, wherein the location determination area comprises a rectangular playing field, wherein it is possible to associate a first coordinates with an object location, the device further comprising:
      four linear sequential transmitters, wherein one linear sequential transmitter is situated along each side of the rectangular playing field, each sequential transmitter having at least two antennas for sequentially transmitting periodic signals having a carrier frequency, the antennas being arranged along a line;
      an object positioned within the location determination area, wherein the position of the object may be determined, the object further comprising:
      a receiver for receiving periodic signals from at least one of the four linear sequential transmitters; and,
      a location determiner for determining the first coordinate of the object location on the basis of a zero crossing of a Doppler frequency response which may be associated with the first coordinate of the object location, the first coordinate of the object location corresponding to a coordinate of that location of one of the at least two antennas of at least one linear sequential receiver which it has when transmitting the periodic signal at the zero crossing in relation to the object location.

9. A method for providing simulated Doppler effect information about an object location within a location determination area, comprising:
   establishing a location determination area comprising a rectangular playing field, wherein the local determination area is associated with four linear sequential receivers, wherein one linear sequential transmitter is situated along each side of the rectangular playing field, wherein each linear sequential receiver has at least two antennas are arraigned along a line;

positioning an object within the location determination area, wherein the object is configured to transmit periodic signals having a carrier frequency;
   sequentially receiving periodic signals using the at least two antennas of at least one linear sequential receiver; and
   determining the first coordinate of the object location on the basis of a zero crossing of a Doppler frequency response which may be associated with the first coordinate of the object location, the first coordinate of the object location corresponding to a coordinate of that location of one of the at least two antennas of at least one linear sequential receiver which it has when transmitting or receiving the periodic signal at the zero crossing in relation to the object location.

10. A computer program having a program code for performing a simulated Doppler effect method for providing information about an object positioned within a location determination area, it being possible to associate a first coordinate with the object location, comprising:
   providing a location determination area comprising a rectangular playing field, wherein the location determination area is associated with four linear sequential receivers, wherein one linear sequential receiver is situated along each side of the rectangular playing field, each linear sequential receiver having at least two antennas for sequentially receiving periodic signals having a carrier frequency at various locations using the at least two antennas;
   a movable object within the location determination area containing a transmitter for transmitting period signals having a carrier frequency, simulating a Doppler effect;
   determining the first coordinate of the object location on the basis of a zero crossing of a Doppler frequency response which may be associated with the first coordinate of the object location within the location determination area, the first coordinate of the object location corresponding to a coordinate of that location of one of the at least two antennas of at least one linear sequential receiver which it has when transmitting or receiving the periodic signal at the zero crossing in relation to the object location, when the computer program runs on a computer or a microcontroller.

* * * * *